(12) United States Patent
Chen et al.

(10) Patent No.: US 8,865,296 B2
(45) Date of Patent: Oct. 21, 2014

(54) DESIGNED DEFECTS IN LAMINATE COMPOSITES

(71) Applicant: Cal Poly Corporation, San Luis Obispo, CA (US)

(72) Inventors: John C. Chen, San Luis Obispo, CA (US); Joseph D. Mello, Atacasdero, CA (US); Luz Elena Gomez, San Luis Obispo, CA (US)

(73) Assignee: Cal Poly Corporation, San Luis Obispo, CA (US)

( * ) Notice: Subject to any disclaimer, the term of this patent is extended or adjusted under 35 U.S.C. 154(b) by 0 days.

(21) Appl. No.: 13/830,648

(22) Filed: Mar. 14, 2013

(65) Prior Publication Data

US 2014/0272324 A1   Sep. 18, 2014

(51) Int. Cl.
*B32B 3/00* (2006.01)
*B32B 37/14* (2006.01)
*B32B 7/04* (2006.01)

(52) U.S. Cl.
CPC ............... *B32B 37/14* (2013.01); *B32B 7/045* (2013.01)
USPC ........................................ 428/195.1; 428/201

(58) Field of Classification Search
USPC ................................. 428/195.1, 201
See application file for complete search history.

(56) References Cited

U.S. PATENT DOCUMENTS

| | | | |
|---|---|---|---|
| 5,169,475 A | 12/1992 | Tobin | |
| 5,230,944 A | 7/1993 | Beer | |
| 5,389,180 A | 2/1995 | MacCollum | |
| 6,759,659 B2 | 7/2004 | Thomas | |
| 7,981,495 B2 | 7/2011 | Kim | |
| 2005/0147781 A1* | 7/2005 | Dronzek et al. | 428/40.1 |
| 2005/0255298 A1* | 11/2005 | Crum | 428/195.1 |
| 2011/0217160 A1 | 9/2011 | McMillan | |

FOREIGN PATENT DOCUMENTS

| | | |
|---|---|---|
| EP | 0934160 | 8/2004 |
| WO | 02056809 | 7/2002 |

OTHER PUBLICATIONS

Chai et al., "One Dimensional Modeling of Failure in Laminated Plates by Delamination Buckling," Int. J. Solids Structures vol. 17, No. 11, pp. 1069-1083 (1981).

(Continued)

*Primary Examiner* — Elizabeth Mulvaney
(74) *Attorney, Agent, or Firm* — Todd R. Miller

(57) ABSTRACT

Novel methods and kits for creating defects in composite materials, as well as an engineered part or structure with one or more designed defects, are disclosed. The disclosed inventions advantageously permit the intentional introduction of one or multiple defects of any desired size and shape, either between the same two chosen laminae or on different layers within a multi-layer composite, having mechanical and thermal properties that are akin to those found for actual defects. One disclosed method involves creating a mask having a cut-out in the size and shape of a desired defect, placing the mask at a location on a first substrate where the defect is desired, applying a release agent, removing the mask, and adding a second substrate over the first substrate with release agent. The first substrate may be a cured lamina or an uncured lamina pre-impregnated with resin having a barricade in the size and shape of the outline of the desired defect.

23 Claims, 9 Drawing Sheets

(56) References Cited

OTHER PUBLICATIONS

Kephart et al., "Characterization of Crack Propagation During Sonic IR Inspection," Thermosense XXVII, edited by G. Raymond Peacock, Douglas D. Burleigh, Jonathan J. Miles, Proceedings of SPIE vol. 5782 (SPIE, Bellingham, WA, 2005).

Pieczonka et al., "Numerical simulations for impact damage detection in composites using vibrothermography,"IOP Conf. Series: Materials Science and Engineering 10 (2010).

Henneke et al., "Vibrothermography: Investigation, Development, and Application of a New Nondestructive Evaluation Technique," Nov. 26, 1986.

Holland et al., "Quantifying the vibrothermographic effect," DOI: http://dx.doi.org/10.1016/j.ndteint.2011.07.006, Jul. 11, 2011.

Salazar et al., "Characterization of delaminations by lock-in vibrothermography," Journal of Physics: Conference Series 214 (2010).

* cited by examiner

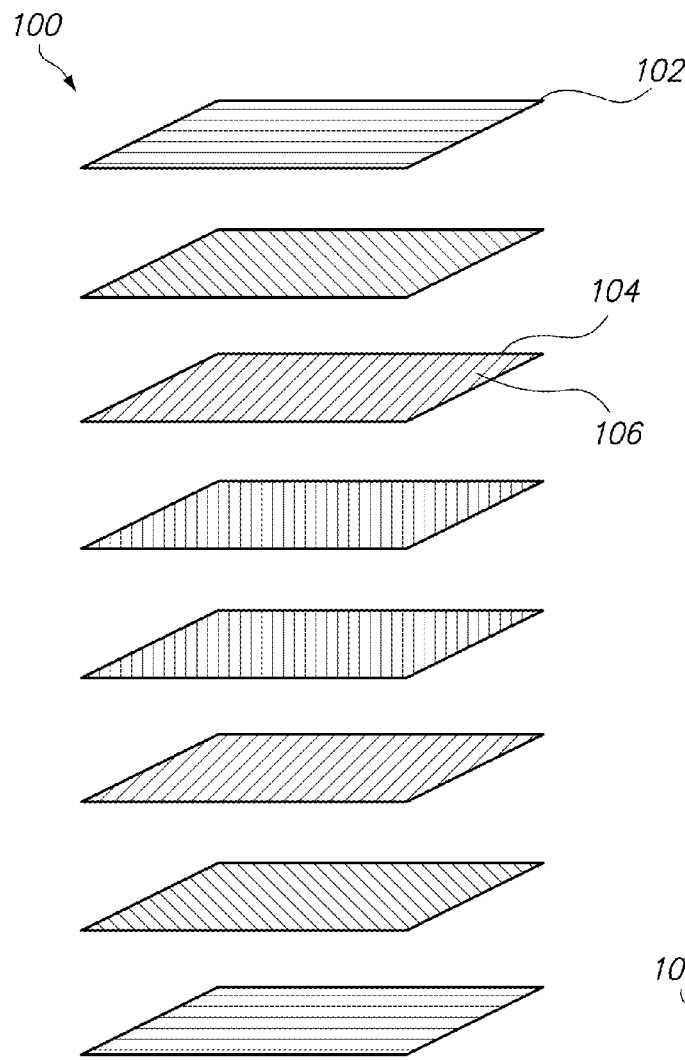
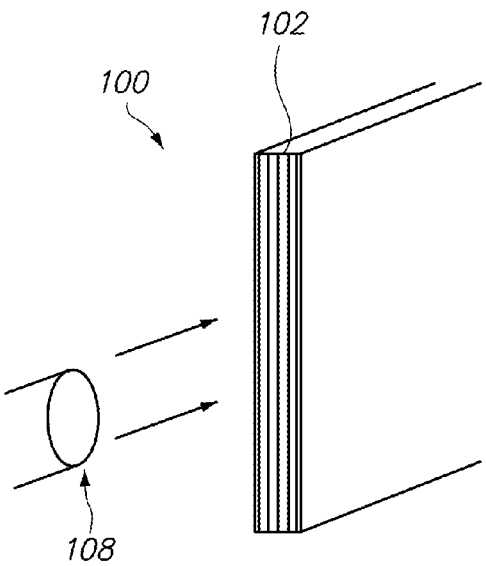
FIG. 1A
FIG. 1B

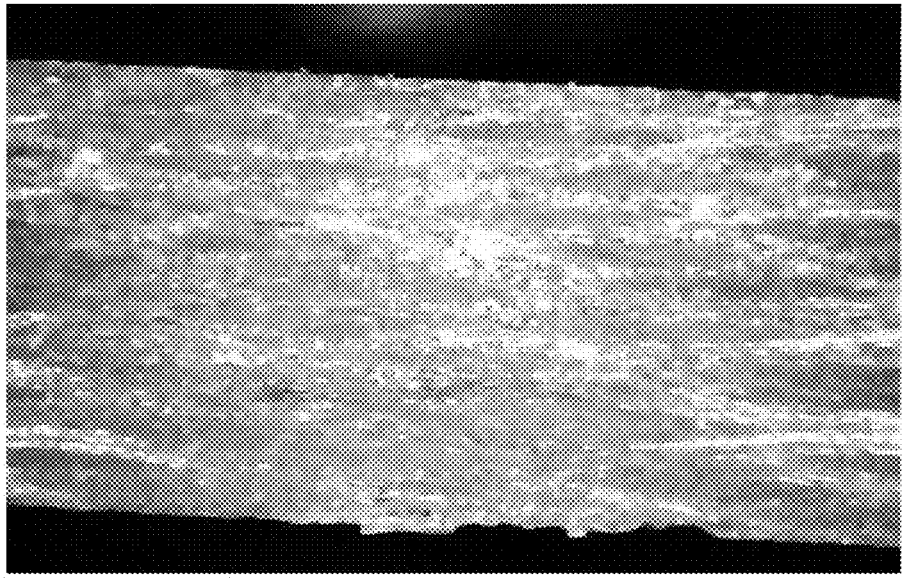
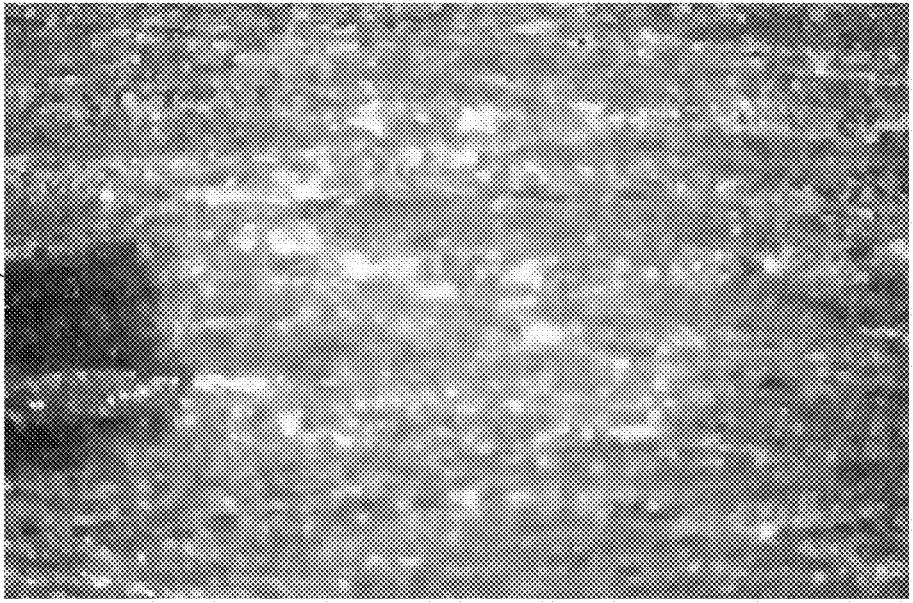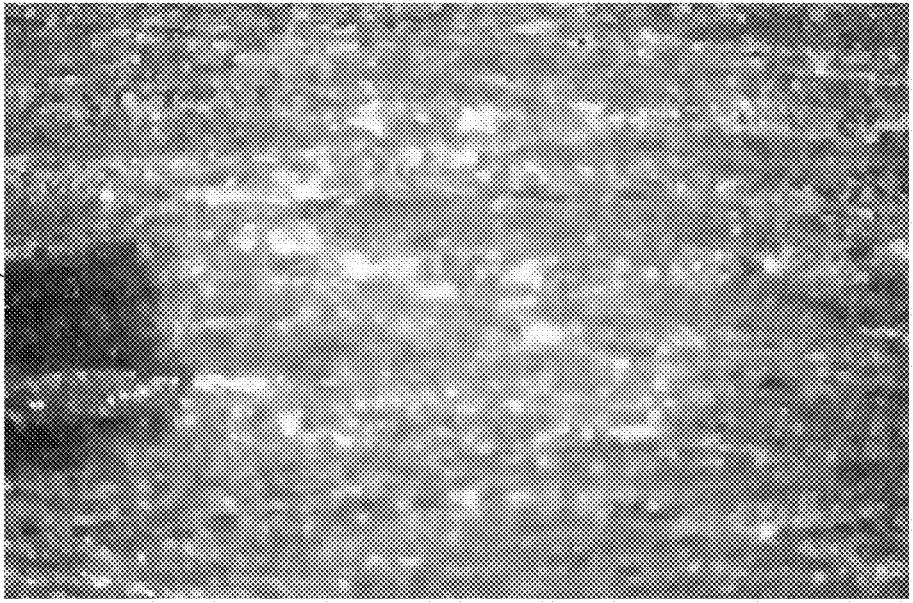
FIG. 3A
FIG. 3B

DESIGNED DEFECTS IN LAMINATE COMPOSITES

FEDERALLY SPONSORED RESEARCH/DEVELOPMENT

This invention was made with government support under NSF 0722820 (transferred to NSF 0914214) awarded by the National Science Foundation and ONR N00014-11-1-0359 awarded by the Office of Naval Research. The government has certain rights in the invention.

BACKGROUND

The present disclosure relates generally to composites and particularly to designed defects in a laminate composite.

In fiber-based laminated composites of any kind, the basic building material is composed of thin sheets (or laminae) of the main structural component such as carbon fiber, glass fiber, Kevlar® or the like. An engineered part or structure is created by "laying up" successive layers of lamina to achieve the final design. A resin, epoxy, or the like is used to hold the laminae in place and provide rigidity. The lamina is available as either pre-impregnated with the resin (so called "prepreg" material) or in its raw form without any resin, with the resin added during the manufacturing process through a variety of means.

The engineered part or structure may have a complex shape, which is usually achieved by the use of a mold into which the laminae are laid. The final step to creating the composite part or structure is to cure the resin, the method of which is dependent on the resin used.

With any method of composite creation, great care is taken during manufacturing to ensure that the resin fully envelops or saturates the laminae to ensure bonding between the laminae and within each lamina. Defects such as porosity (small voids) and delaminations (physical separation or gap between laminae) must be avoided to ensure the part or structure meets the design specifications and maintains structural integrity throughout its designed life. In addition to manufacturing defects, a delamination may also result from an unintentional impact event, for example.

As defects are a common problem occurring in laminated composite materials, it is important to determine whether a defect exists in laminated parts or structures. Myriad techniques exist for identifying a defect including nondestructive testing or inspection methods. Such techniques include vibrothermography, lock-in thermography, pulsed thermography, and ultrasound-based methods, for example. Regardless of the technique, there is a need for a "standard" test specimen so various techniques can be compared to assess their effectiveness at locating defects. An appropriate test specimen may also be used as a demonstration or a calibration standard for a manufacturer of nondestructive inspection equipment. Similarly, manufacturers of composite materials may also wish to create samples with intentional, artificial defects for testing a material's strength when defects are present or otherwise quantify the decrease in performance due to a defect, or for helping their customers identify a defect.

A conventional method of creating a delamination defect involves the insertion of a thin plastic (usually polytetrafluoroethylene ("PTFE")) membrane in the composite sample to simulate the actual defect. For certain inspection techniques, this conventional method may be acceptable. However, for others, namely vibrothermography, lock-in thermography, pulsed thermography, and perhaps some ultrasound-based techniques, such a conventional method may not suffice because of the difference in mechanical and thermal properties between a real delamination and a plastic membrane or insert.

Accordingly, novel methods and kits that intentionally introduce one or multiple defects of any desired size and shape, either between the same two chosen laminae or on different layers within a multi-layer composite, having mechanical and thermal properties that are akin to those found for actual defects, as well as an engineered part or structure with one or more such designed defects, are therefore desired.

SUMMARY

One exemplary embodiment of the disclosed subject matter is a method of creating a defect in a composite including creating a mask having a cut-out in the size and shape of a desired defect, placing the mask at a location on a first substrate where the defect is desired, applying a release agent, removing the mask, and adding a second substrate over the first substrate with release agent. The first and second substrates may be laminae. The first substrate may be a cured lamina or an uncured lamina pre-impregnated with resin having a barricade in the size and shape of the outline of the desired defect.

Another exemplary embodiment of the disclosed subject matter is a method comprising curing a first lamina pre-impregnated with resin, creating a mask having a cut-out in the size and shape of a desired defect, placing the mask at a location on the first lamina where the defect is desired, applying a release agent, removing the mask, adding a second lamina pre-impregnated with resin, and curing the second lamina pre-impregnated with resin.

Yet another exemplary embodiment of the disclosed subject matter is a kit comprising a first lamina, a mask having a cut-out in the size and shape of a desired defect, a release agent, and a second lamina comprising an uncured ply pre-impregnated with resin. The first lamina may be a cured fiber-reinforced material. The mask may be a plastic sheet. The first lamina may include cross-linked polymers in the outline of the size and shape of the desired defect.

BRIEF DESCRIPTION OF THE DRAWINGS

Some non-limiting exemplary embodiments of the disclosed subject matter are illustrated in the following drawings. Identical or duplicate or equivalent or similar structures, elements, or parts that appear in one or more drawings are generally labeled with the same reference numeral, optionally with an additional letter or letters to distinguish between similar objects or variants of objects, and may not be repeatedly labeled and/or described. Dimensions of components and features shown in the figures are chosen for convenience or clarity of presentation. For convenience or clarity, some elements or structures are not shown or shown only partially and/or with different perspective or from different point of views.

FIG. 1A is an exploded view of an exemplary schematic representation of a fiber-based laminate composite;

FIG. 1B is a perspective view of an exemplary schematic representation of a fiber-based laminate composite showing a camera's viewing angle oriented toward the composite samples seen in FIGS. 2A-3B;

FIG. 3A is a magnified view (40×) of a "kissing delamination" defect between the sixth and seventh plies of a twelve-ply carbon fiber composite sample according to an embodiment of the inventions disclosed herein, wherein the defect in its natural unstressed state cannot be seen;

FIG. 3B is a magnified view (approximately 120×) of the composite sample of FIG. 3A having a dark line made with a sharp-pointed marker to show the approximate location of the centerline of the delamination;

DETAILED DESCRIPTION

Figure 2A:
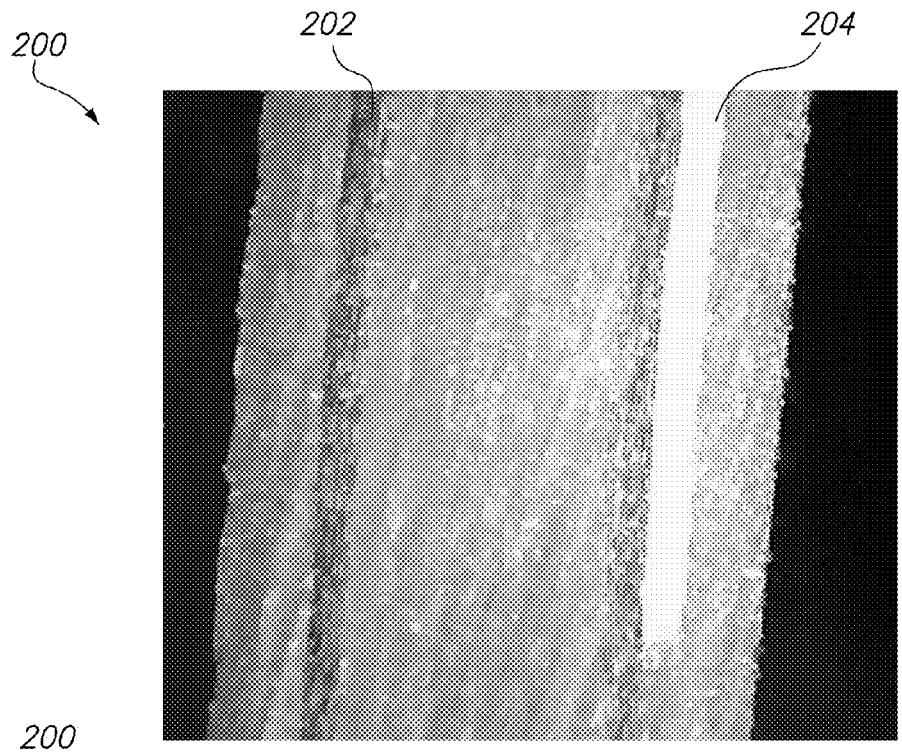
FIG. 2A is a magnified view of a 0.010 inch thick PTFE insert embedded between the second and third plies of a twelve-ply carbon fiber composite sample.

A general problem in the field of laminate composites is an appropriate test specimen for comparing the effectiveness of various nondestructive testing or inspection methods of locating defects. A general solution is the use of novel methods for intentionally creating a standard test specimen so various inspection techniques may be compared.

A technical problem in the field of laminate composites is a test specimen that serves as a proxy for an actual defect. A technical solution implementing the spirit of the disclosed inventions is the use of novel methods or kits that intentionally introduce one or multiple defects of any desired size and shape, either between the same two chosen laminae or on different layers within a multi-layer composite, having mechanical and thermal properties that are akin to those found for actual defects.

Potential benefits of the general and technical solutions provided by the disclosed subject matter include those identified above plus the creation of a test specimen that may also be used as a demonstration or a calibration standard for a manufacturer of nondestructive inspection equipment. Similarly, the disclosed inventions may advantageously be used to create intentional, artificial defects for testing a material's strength when defects are present or otherwise quantify the decrease in performance due to a defect.

A general non-limiting overview of practicing the present disclosure is presented below. The overview outlines exemplary practice of embodiments of the present disclosure, providing a constructive basis for variant and/or alternative and/or divergent embodiments, some of which are subsequently described.

FIG. 1A is an exploded view of an exemplary schematic representation of a fiber-based laminate composite 100 comprised of thin sheets/laminae/plies 102 of fibers 104. The fibers may be carbon fiber, glass fiber, Kevlar®, or the like. The fibers 104 are held in place by a resin 106. If the fibers 104 are pre-impregnated with resin 106 (instead of adding the resin during the manufacturing process), the sheet 102 is often referred to as a prepreg. FIG. 1A shows a composite 100 comprised of prepregs and particularly unidirectional carbon-fiber sheets 102 comprised of long carbon fibers 104 all laid up in the same orientation in a binder of resin 106. Each fiber sheet 102 is then cut to size and oriented relative to one another in some pre-determined pattern to form a final sample, such as quasi-isotropic sample 100 illustrated in FIG. 1A, which shows an eight-ply layup. The orientation of each ply 102 accounts for how samples 100 may look when cut or viewed cross-sectionally. For example, when the carbon fibers 104 are aligned with the direction of the cut, the fibers may appear as dark bands, such as bands 202 seen in FIGS. 2A and 2B.

Figure 2B:
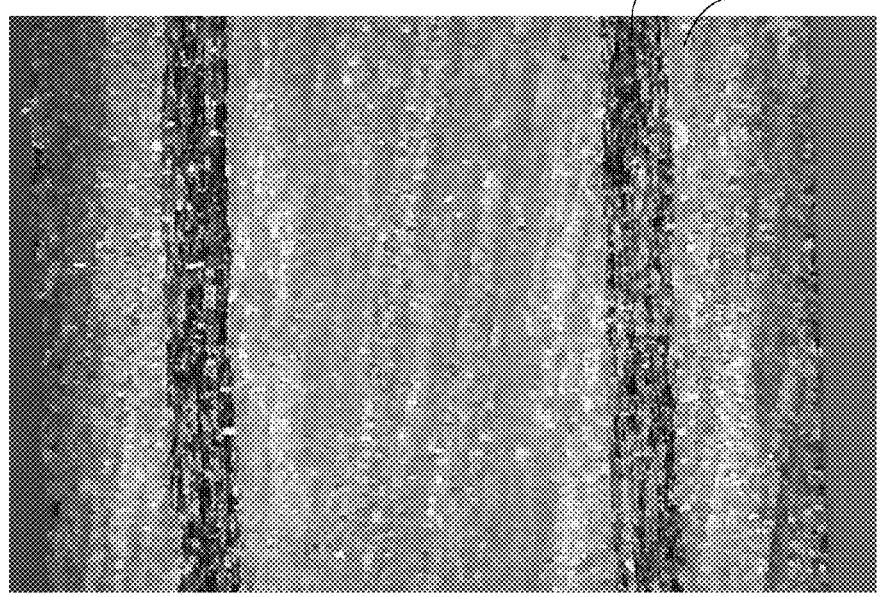
FIG. 2B is a magnified view of a 0.002 inch thick PTFE insert embedded between the second and third plies of a twelve-ply carbon fiber composite sample.

FIGS. 2A and 2B are photographs of samples 200 in which the orientation of the samples 200 seen in the photographs is shown schematically in FIG. 1B. Turning in detail to FIGS. 2A and 2B, each sample 200 has been made via a conventional approach to creating a delamination in an engineered part or structure wherein a film or insert (usually a PTFE insert because of its low coefficient of friction) is sandwiched between two opposing layers. FIG. 2A is a magnified view of a 0.010 inch thick PTFE insert 204 embedded between the second and third plies (each with their own unidirectional carbon fibers 202, some of which are seen as dark bands due to the direction of the cut made in sample 200) of a twelve-ply carbon fiber composite sample. FIG. 2B is a magnified view of a 0.002 inch thick PTFE insert 204 embedded between the second and third plies (each with their own unidirectional carbon fibers 202, some of which are seen as dark bands due to the direction of the cut made in sample 200) of a twelve-ply carbon fiber composite sample.

In contrast to FIGS. 2A and 2B that show an embedded insert or film sandwiched between two opposing layers, FIGS. 3A and 3B show novel samples 300 in which no insert or film is sandwiched between any opposing layers. The result 300 is a better proxy to an actual, real-world delamination.

FIG. 3A particularly shows a magnified view (40×) of a sample 300 with a designed defect made according to an embodiment of the inventions disclosed herein. The sample 300 is oriented horizontally. The defect forms a "kissing delamination" and, in its natural unstressed state, cannot be seen. The sample 300 is made from a different form of carbon fiber, namely a "weaved cloth," and twelve plies of this cloth, which is also a prepreg, make up this sample 300. The (unseen) delamination is in the exact center of this cross-section, between the sixth and seventh plies. FIG. 3B is a high magnification (approximately 120×) of the composite sample 300 of FIG. 3A having a dark line 302 made with a sharp-pointed marker to show the approximate location of the centerline of the (unseen) delamination.

Figure 4A:
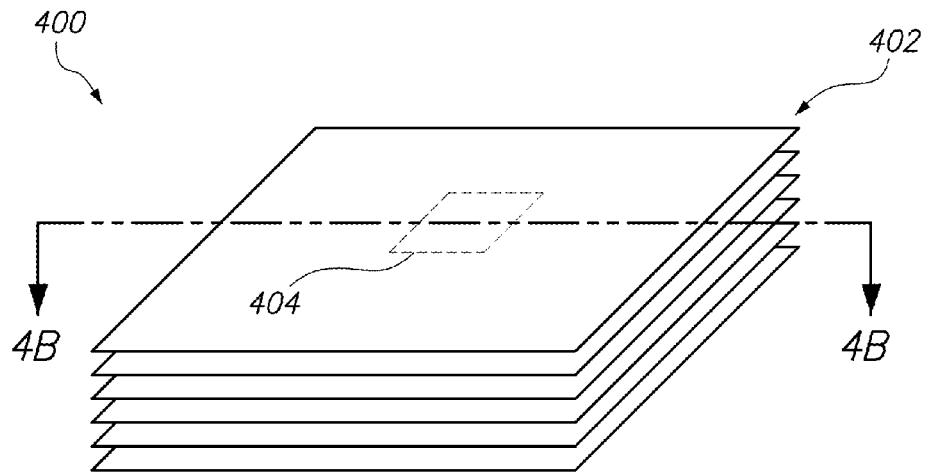
FIG. 4A is a perspective view of an exemplary schematic representation of a fiber-based laminate composite with a PTFE insert embedded therein.
Figure 4B:
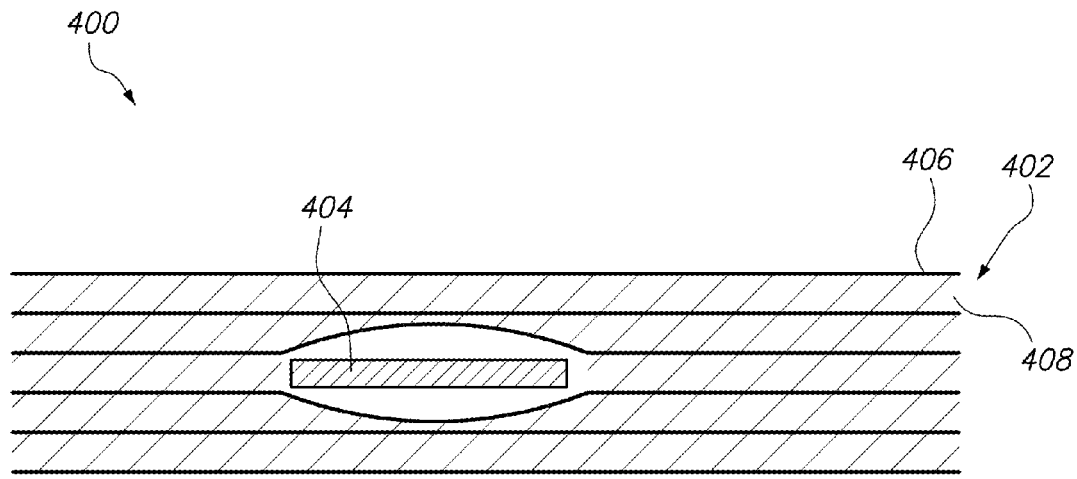
FIG. 4B is a cross-section view of the exemplary schematic representation of the fiber-based laminate composite of FIG. 4A.

FIG. 4A is a perspective view of an exemplary schematic representation of a fiber-based laminate composite made conventionally with an insert embedded therein. FIG. 4B is a cross-section view of the exemplary schematic representation of the fiber-based laminate composite of FIG. 4A. As seen in FIGS. 4A and 4B, a sample 400 is comprised of sheets 402 comprised of fibers 406 held in place by resin 408. A conventional PTFE insert 404 is sandwiched between opposing layers 402 of sample 400.

Figure 5A:
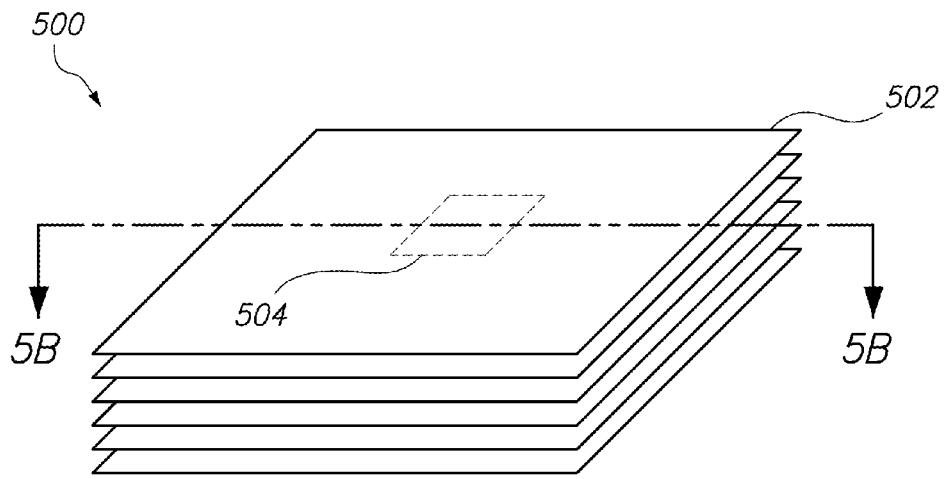
FIG. 5A is a perspective view of an exemplary schematic representation of a fiber-based laminate composite with a kissing delamination defect according to an embodiment of the inventions disclosed herein.
Figure 5B:
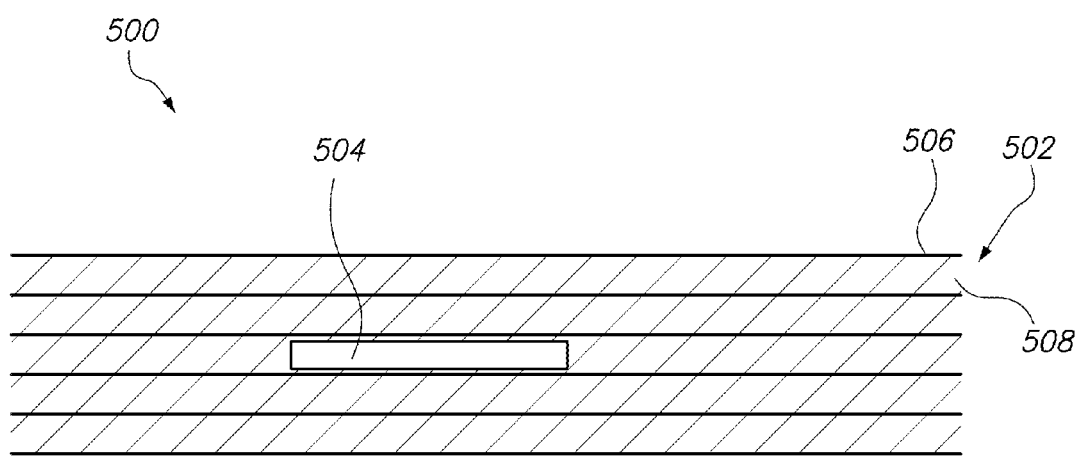
FIG. 5B is a cross-section view of the exemplary schematic representation of the fiber-based laminate composite of FIG. 5A.

FIG. 5A is a perspective view of an exemplary schematic representation of a fiber-based laminate composite with a kissing delamination defect according to an embodiment of the inventions disclosed herein. FIG. 5B is a cross-section view of the exemplary schematic representation of the fiber-based laminate composite of FIG. 5A. As seen in FIGS. 5A and 5B, a sample 500 is comprised of sheets 502 having fibers 506 held in place by resin 508. A resin and material-free kissing delamination 504 is illustrated as being disposed between two layers 502 of sample 500. The delamination 504 is shown as being a large gap for illustrative purposes only; however, the delamination 504 is actually infinitesimally small.

Because there is a fundamental difference between transferring heat through a film or insert (such as insert 204 shown in FIGS. 2A and 2B, or insert 404 shown in FIGS. 4A and 4B) versus an infinitesimally small gap (such as kissing delamination not seen in FIGS. 3A and 3B, or represented as defect 504 in FIGS. 5A and 5B), there is a significant difference between the two types of artificial delaminations when inspected using thermal-based nondestructive inspection techniques. Furthermore, when the inspection technique relies on the generation of heat at the delamination, the two proxies also differ significantly in performance. In short, the delaminations created using the inventions disclosed herein create a better proxy to an actual, real-world delamination.

Figure 6:
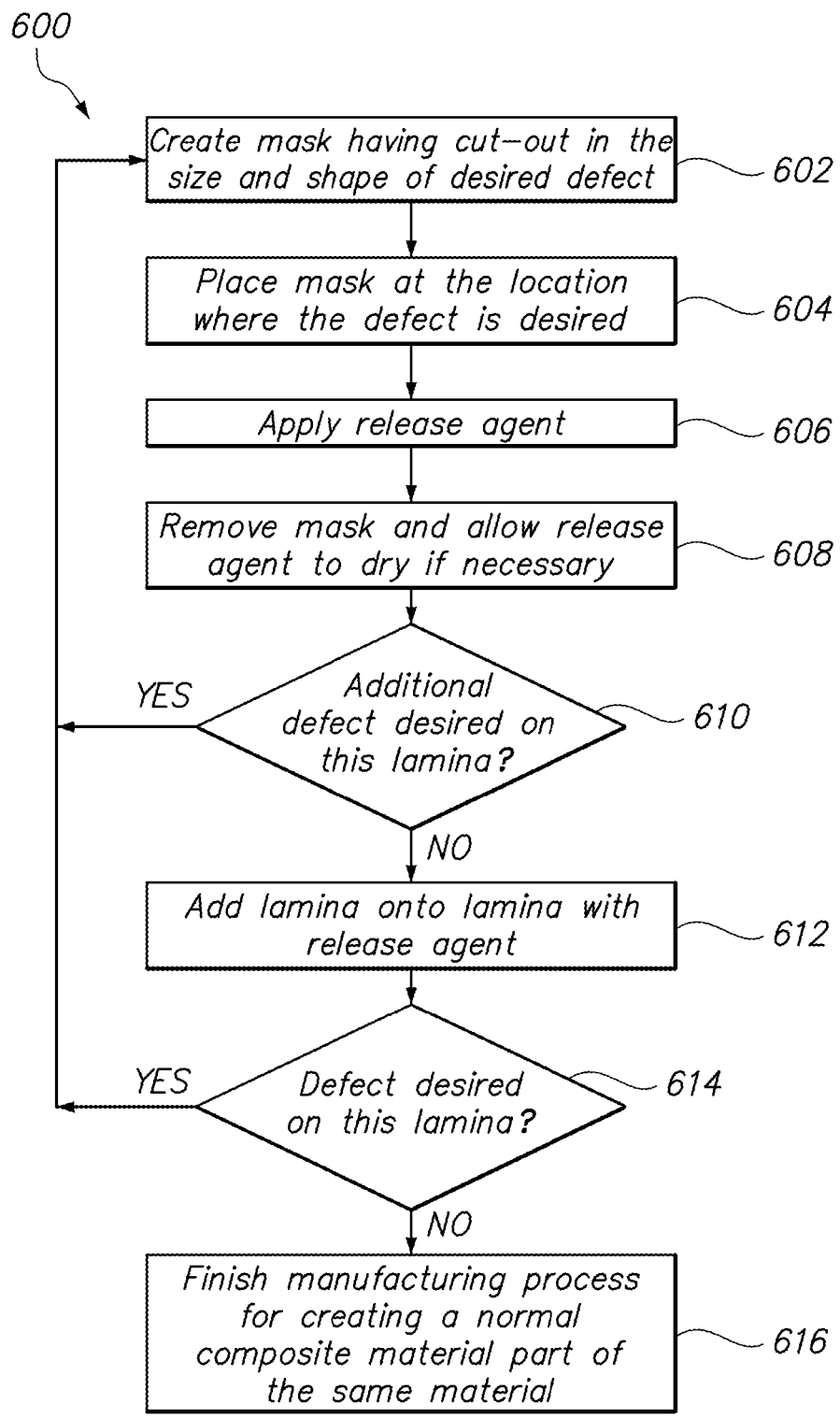
FIG. 6 is an exemplary overview flowchart of a method of creating a delamination in a composite according to an embodiment of the inventions disclosed herein.

FIG. 6 is an exemplary overview flowchart of a method 600 of creating a delamination in a composite according to an embodiment of the inventions disclosed herein. The first step preferably involves the creation of a mask made from a thin material (e.g., heavyweight paper, plastic sheet, metal sheet) that contains a cut-out in the size and shape of the desired defect, such as step 602 illustrates in FIG. 6. During the lay-up process for creating the composite part, this mask is placed at the location where the defect is desired, as illustrated in step 604. The placement may be on a substrate that may be an uncured lamina, cured lamina, aluminum layer, titanium layer, etc.

In step 606, a release agent is then applied to the mask. The release agent is preferably a mold-release agent, such as Frekote® 700-NC, commonly applied to a mold to ensure that the finished part is separable from and not adhered to the mold. However, any reliable release agent designed for the type of composite material in use will work reliably for this purpose. Once the release agent is applied, the mask is removed and the release agent is allowed to dry, if necessary, per step 608. As shown in step 610, if an additional defect is desired on this lamina, then the process repeats with step 602. If an additional defect is not desired on this lamina, then the next step 612 involves adding a lamina onto the substrate with release agent. As shown in step 614, if a defect is desired on this lamina, then the process repeats with step 602. If a defect is not desired on this lamina, then any remaining lamina(e) to be laid up are added and any desired defects on any remaining lamina(e) are created as disclosed above. Per step 616, once any remaining lamina(e) is laid up, the remainder of the manufacturing process is identical to the process for creating a normal composite material part of the same material. For example, the laminae may be cured as desired per the usual process, or if the lamina is in its raw form without any resin, the resin may be added during the process through a variety of conventional means known to those skilled in the art.

As disclosed above, the mask may be placed on a cured lamina (in which case an uncured lamina, either pre-impregnated with resin or a non-pre-impregnated one that is infused with resin, is first cured), uncured lamina, or other material. When placed on an uncured lamina pre-impregnated with resin, a barricade is preferably formed on the uncured lamina in the outline of the desired defect. The barricade helps maintain the integrity of release agent during the manufacturing process. To elaborate, when the uncured lamina is cured during the manufacturing process, the resin in which the fibers are bathed becomes a much lower viscosity liquid that is fluid within the entire laminated structure of the sample. This fluid may impede the creation of the designed defect by (1) diluting the release agent given its much greater relative volume, and (2) transporting the release agent away from where it was applied via the mask. A barricade between the release agent and the uncured resin prevents any such dilution of the release agent and its transportation away from the lamina. The barricade may be created on the uncured lamina in a number of ways including but not limited to (1) initiating the cross-linking of the polymers within the resin by "branding" the uncured lamina, such as by heating the uncured lamina with an object that is the size and shape of the outline of the desired defect, or (2) creating a mask having a cut-out in the size and shape of the outline of the desired defect, applying a non-release agent that will remain intact during and after a curing process, and removing that mask. Once this barricade has been made, the overall disclosed method 600 may begin with step 602 and continues as disclosed above.

Figure 7A:
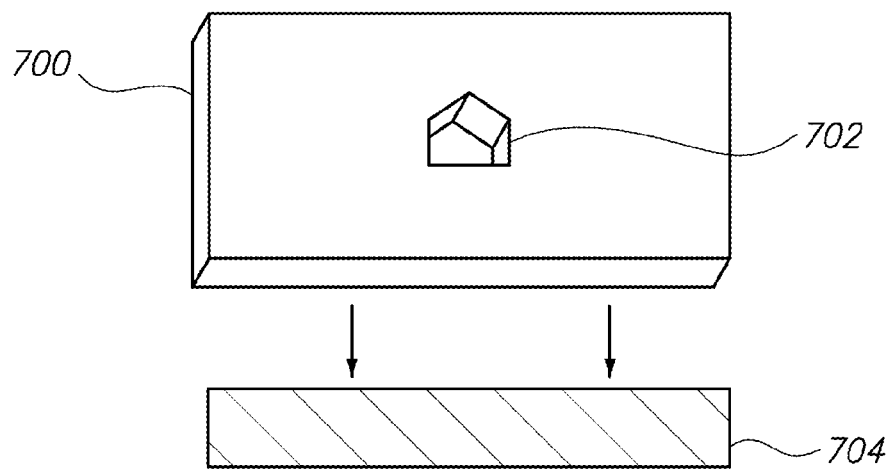
FIG. 7A is an exemplary schematic representation of one aspect of forming a composite with a kissing delamination defect according to an embodiment of the inventions disclosed herein.
Figure 7B:
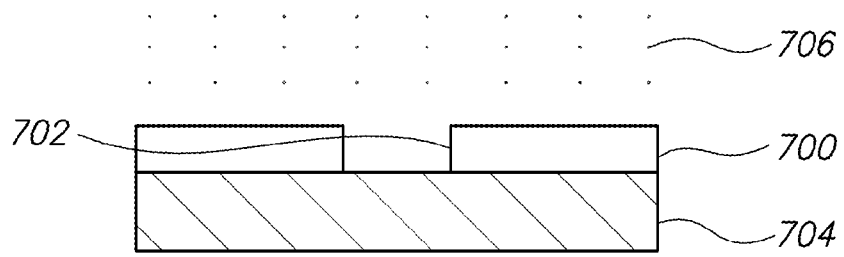
FIG. 7B is an exemplary schematic representation of another aspect of forming a composite with a kissing delamination defect according to an embodiment of the inventions disclosed.
Figure 7C:
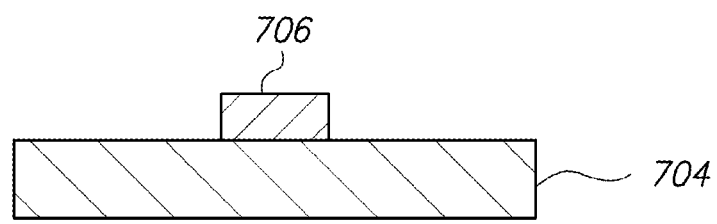
FIG. 7C is an exemplary schematic representation of another aspect of forming a composite with a kissing delamination defect according to an embodiment of the inventions disclosed herein.
Figure 7D:
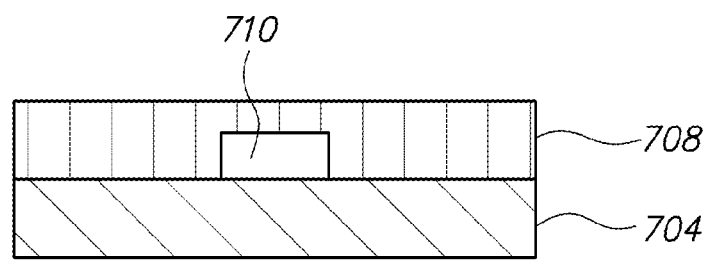
FIG. 7D is an exemplary schematic representation of another aspect of forming a composite with a kissing delamination defect according to an embodiment of the inventions disclosed.

FIGS. 7A through 7D are exemplary schematic representations of aspects of forming a composite with a kissing delamination defect according to an embodiment of the inventions disclosed herein. As seen in FIG. 7A, a mask 700 with cut-out 702 in the size and shape of a desired defect is placed on a substrate 704 at the location where the defect is desired. Release agent 706 is then applied with the mask 702 overlaying the substrate 704, as illustrated in FIG. 7B. The mask is then removed to allow the release agent to dry, if necessary, resulting in release agent 706 disposed about the underlying substrate 704 in the size and shape of the cut-out 702, as represented in FIG. 7C. An additional substrate 708 may be laid up as seen in FIG. 7D, with any additional defects as desired, and the disclosed steps repeated as desired. The manufacturing process of the composite is then finished for creating a normal composite material part of the same material. The result is in an engineered part or structure with kissing delamination 710 formed therein.

Figure 8A:
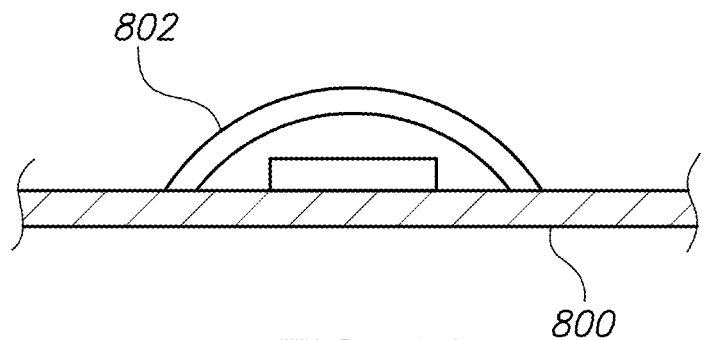
FIG. 8A is an exemplary schematic representation of one aspect of forming a composite with a three-dimensional defect according to an embodiment of the inventions disclosed herein.
Figure 8B:
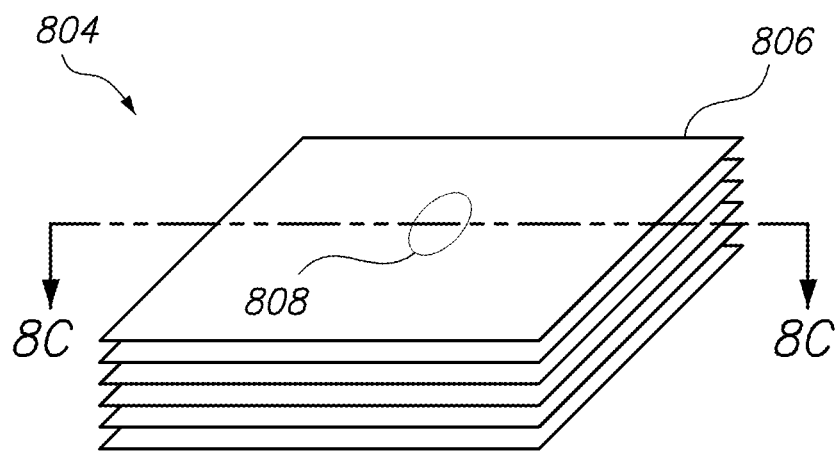
FIG. 8B is a perspective view of an exemplary schematic representation of a composite with a three-dimensional defect according to an embodiment of the inventions disclosed herein.
Figure 8C:
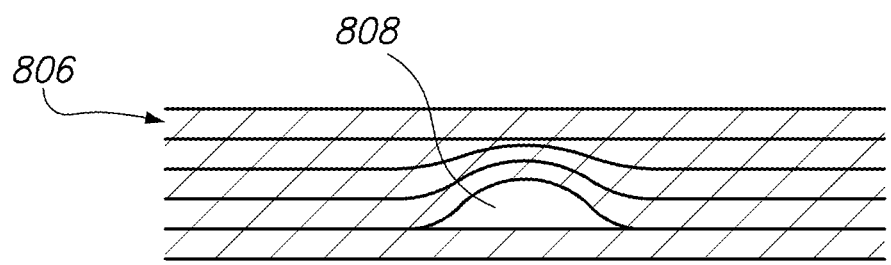
FIG. 8C is a cross-section view of the exemplary schematic representation of the composite of FIG. 8B.

FIGS. 8A through 8C are exemplary schematic representations of aspects of forming a composite with a three-dimensional delamination defect according to an embodiment of the inventions disclosed herein. FIG. 8A shows multiple successive coats of release agent 802 that has been applied onto a substrate 800 to build up a three-dimensional structure in the size and shape of the desired defect. Again, the substrate 800 may be a cured lamina or a different material. The final engineered part or structure 804 is shown in FIGS. 8B and 8C, wherein a defect 808 in seen disposed between layers 806. The defect 808 is a simulated void, air pocket inclusion, or wrinkle that mimics an actual void defect in an engineered part or structure.

Figure 9:
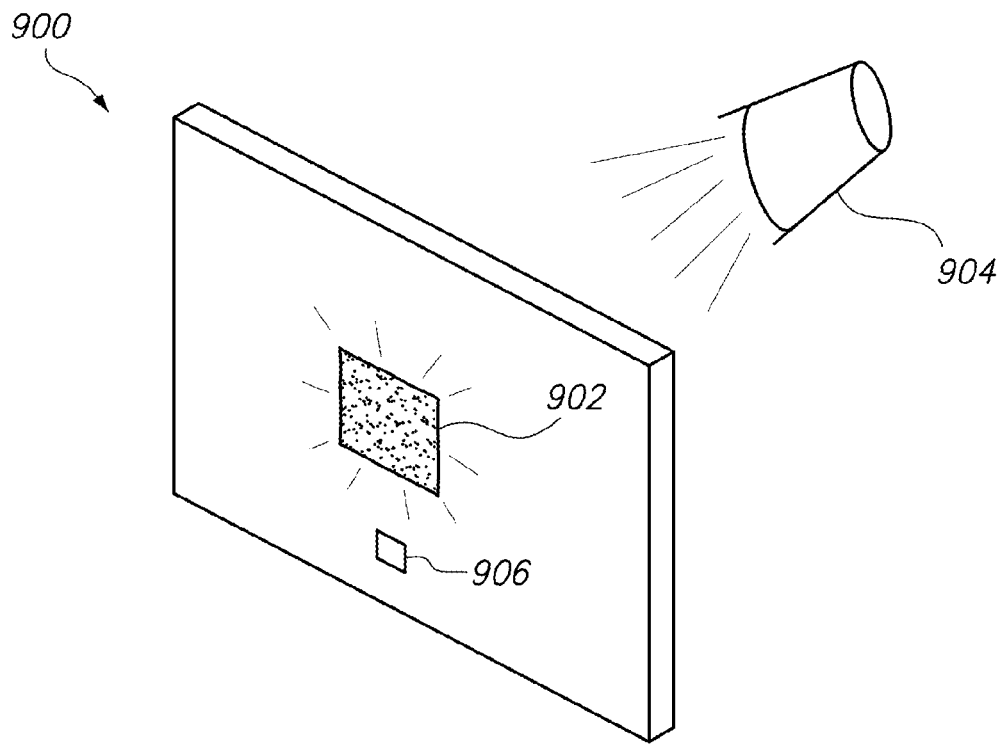
FIG. 9 is an exemplary schematic representation of a composite with designed defect therein according to an embodiment of the inventions disclosed showing how the disclosed inventions are particularly useful as test specimens during nondestructive testing or inspection methods, as well as a defect made according to conventional means for comparison.
Figure 10:
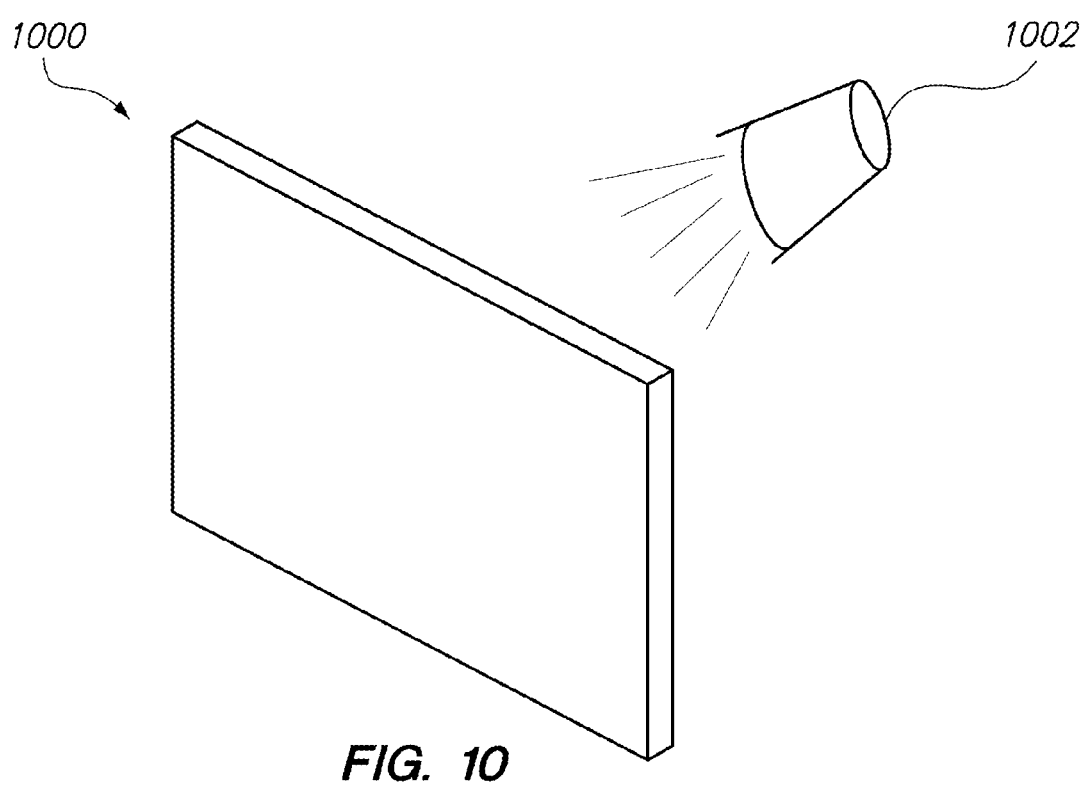
FIG. 10 is an exemplary schematic representation of a composite without any defects therein, resulting in the absence of any indication of a defect during nondestructive testing.

FIG. 9 is an exemplary schematic representation of a composite 900 with designed delamination defect 902 therein according to an embodiment of the inventions disclosed showing how the disclosed inventions are particularly useful as test specimens during nondestructive testing or inspection methods. The testing method shown in FIG. 9 is a flash lamp or heat source 904 used to heat up the back of the composite 900 to reveal the defect 902 on the front of the composite 900. FIG. 9 also shows a delamination defect 906 made via conventional means, namely, a PTFE insert. Both defects 902 and 906 are buried between the sixth and seventh plies of a twelve-ply sample. When compared to one another, it is clear that the two simulated delamination defects 902, 906 behave differently during a nondestructive testing method. The designed delamination defect 902 produces a drastically different temperature and heat signature than the PTFE insert 906. FIG. 10 is an exemplary schematic representation of a composite 1000 without any defects therein, resulting in an absence of any indication of a defect therein during nondestructive testing using a flash lamp or heat source 1002.

As disclosed above, there are a number of items that may be employed in the novel methods used to design defects in composite materials. These items may be included in a kit. The kit may include but need not be limited to a first lamina, a mask having a cut-out in the size and shape of a desired defect, a release agent, and a second lamina comprising an uncured ply pre-impregnated with resin. The first lamina may be a cured fiber-reinforced material. The mask may be a plastic sheet. The release agent may be a mold release agent. Instead of a cured fiber-reinforced material, the first lamina may be an uncured lamina in which cross-linking has been initiated in the outline of the size and shape of the desired defect, as disclosed above. Alternatively, the first lamina may be an uncured lamina having a barricade formed thereon by applying a non-release agent with a mask, as disclosed above.

While certain embodiments have been described, the embodiments have been presented by way of example only and are not intended to limit the scope of the inventions. Indeed, the novel methods, kits, and composites described herein may be embodied in a variety of other forms; furthermore, various omissions, substitutions, and changes in the form of the devices and methods described herein may be made without departing from the spirit of the inventions. The accompanying claims and their equivalents are intended to cover such forms or modifications as would fall within the scope and spirit of the inventions.

The invention claimed is:

1. A method of creating a defect in a composite, the method comprising:
    creating a mask having a cut-out in the size and shape of a desired defect;
    placing the mask at a location on a first substrate where the defect is desired;
    applying a release agent;
    removing the mask; and
    adding a second substrate over the first substrate with release agent.

2. The method of claim 1, wherein the first substrate is a cured lamina.

3. The method of claim 2, wherein the second substrate is an uncured lamina pre-impregnated with resin, and further comprising the step of curing the second substrate.

4. The method of claim 2, further comprising injecting resin about the second substrate after adding the second substrate.

5. The method of claim 1, wherein the first substrate is an uncured lamina pre-impregnated with resin having a barricade formed thereon in the size and shape of the outline of the desired defect.

6. The method of claim 5, wherein the second substrate is an uncured lamina pre-impregnated with resin, and further comprising the step of curing the first and second substrates.

7. The method of claim 1, further comprising the following steps before the step of adding a second substrate:
    placing the mask about the first substrate where another defect is desired;
    applying a release agent; and
    removing the mask.

8. The method of claim 1, further comprising:
    creating a second mask having a second cut-out in the size and shape of a second desired defect;
    placing the second mask at a location on the second substrate where the second defect is desired;
    applying a release agent;
    removing the second mask; and
    adding a third substrate over the second substrate with release agent.

9. A composite made according to the method of claim 1.

10. A method comprising:
    curing a first lamina pre-impregnated with resin;
    creating a mask having a cut-out in the size and shape of a desired defect;
    placing the mask at a location on the first lamina where the defect is desired;
    applying a release agent;
    removing the mask;
    adding a second lamina pre-impregnated with resin; and
    curing the second lamina pre-impregnated with resin.

11. The method of claim 10, wherein the first lamina is a fiber-reinforced material.

12. The method of claim 11, further comprising:
    creating a second mask having a second cut-out in the size and shape of a second desired defect;
    placing the second mask at a location on the second lamina where the second defect is desired;
    applying a release agent;
    removing the second mask; and
    adding a third lamina about the second lamina with release agent.

13. The method of claim 12, further comprising injecting resin about the third lamina.

14. A composite made according to the method of claim 10.

15. A kit for creating a delamination in a layered component, the kit comprising:
- a first lamina;
- a mask having a cut-out in the size and shape of a desired defect;
- a release agent; and
- a second lamina comprising an uncured ply pre-impregnated with resin.

16. The kit according to claim 15 wherein the first lamina is comprised of a cured fiber-reinforced material.

17. The kit according to claim 15 wherein the mask is a plastic sheet.

18. The kit according to claim 15 wherein the release agent is a mold release agent.

19. The kit according to claim 15 wherein the first lamina includes cross-linked polymers in the outline of the size and shape of the desired defect.

20. The kit according to claim 15 wherein the first lamina is comprised of an uncured fiber reinforced plastic material, and further comprising a second mask having a cut-out in the size and shape of the outline of desired defect, and a non-release agent to be applied when the second mask is disposed about the first lamina.

21. The method according to claim 1 wherein the desired defect comprises a proxy for an actual defect.

22. The method according to claim 10 wherein the desired defect comprises a proxy for an actual defect.

23. The kit according to claim 15 wherein the desired defect comprises a proxy for an actual defect.

* * * * *